US011245579B1

(12) United States Patent
Sanchez et al.

(10) Patent No.: US 11,245,579 B1
(45) Date of Patent: *Feb. 8, 2022

(54) PRECONFIGURED DEVICE REPRESENTATIONS

(71) Applicant: Amazon Technologies, Inc., Seattle, WA (US)

(72) Inventors: Juan Antonio Sanchez, Seattle, WA (US); David Craig Yanacek, Seattle, WA (US); Antony Didier Maurice Passemard, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,999

(22) Filed: Dec. 2, 2019

Related U.S. Application Data

(62) Division of application No. 15/385,560, filed on Dec. 20, 2016, now Pat. No. 10,498,598.

(51) Int. Cl.
*H04L 12/24* (2006.01)
*H04L 29/08* (2006.01)

(52) U.S. Cl.
CPC ...... *H04L 41/0809* (2013.01); *H04L 41/0886* (2013.01); *H04L 67/12* (2013.01)

(58) Field of Classification Search
None
See application file for complete search history.

(56) References Cited

U.S. PATENT DOCUMENTS

| 9,059,910 | B1 | 6/2015 | Liu et al. | |
| 9,565,172 | B2 | 2/2017 | Stahl | |
| 10,498,598 | B1 | 12/2019 | Sanchez et al. | |
| 2003/0103088 | A1 | 6/2003 | Dresti et al. | |
| 2004/0133689 | A1* | 7/2004 | Vasisht | H04L 61/2061 709/228 |
| 2010/0082777 | A1* | 4/2010 | Montgomery | H04L 41/085 709/220 |
| 2010/0234009 | A1* | 9/2010 | Antani | H04M 3/42178 455/419 |
| 2012/0303178 | A1 | 11/2012 | Hendry et al. | |
| 2014/0181801 | A1 | 6/2014 | Voronkov et al. | |
| 2014/0201340 | A1* | 7/2014 | Barnhill | H04L 12/2809 709/220 |

(Continued)

*Primary Examiner* — Mohamed Ibrahim
(74) *Attorney, Agent, or Firm* — Knobbe, Martens, Olson & Bear, LLP

(57) ABSTRACT

Technology is described for providing preconfigured device representations in a service provider environment. A plurality of device representation parameters may be received for a device via a user account. A preconfigured device representation may be created for the device using the plurality of device representation parameters. The preconfigured device representation may be associated with the user account. The device may be registered with the service provider environment. A registration of the device may be performed when the device initially connects to the service provider environment. The registration may assign a device identifier to the device and may associate the user account with the device. The preconfigured device representation may be provided to the device after the registration of the device is completed.

20 Claims, 9 Drawing Sheets

(56) References Cited

U.S. PATENT DOCUMENTS

| | | | |
|---|---|---|---|
| 2014/0376405 A1* | 12/2014 | Erickson | H04L 9/3263 370/254 |
| 2015/0222621 A1 | 8/2015 | Baum et al. | |
| 2016/0285703 A1* | 9/2016 | Joe | H04L 41/5051 |
| 2017/0063611 A1 | 3/2017 | Sheba et al. | |
| 2017/0359338 A1 | 12/2017 | Tschofenig et al. | |
| 2018/0084424 A1 | 3/2018 | Sonasath et al. | |

* cited by examiner

PRECONFIGURED DEVICE REPRESENTATIONS

PRIORITY DATA

This application is a division of U.S. patent application Ser. No. 15/385,560, filed Dec. 20, 2016, which is incorporated herein by reference.

BACKGROUND

The Internet of Things (IoT) is the interconnection of computing devices scattered across the globe using the existing Internet infrastructure. IoT devices may be assigned a unique identifier, such as an Internet Protocol version 6 (IPv6) address, an IPv4 address, a uniform resource identifier (URI), or a global unique identifier. IoT devices may securely communicate data over a network to a centralized IoT service in a service provider environment. The IoT devices may register with the IoT service prior to communicating data to the IoT service.

IoT devices may be embedded in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, actuators, motors, software, sensors, and network connectivity that enables these physical devices to collect and exchange data. IoT may be useful for a number of applications, such as environmental monitoring, farming, infrastructure management, industrial applications, building and home automation, energy management, medical and healthcare systems, transport systems, etc.

DETAILED DESCRIPTION

Figure 1:
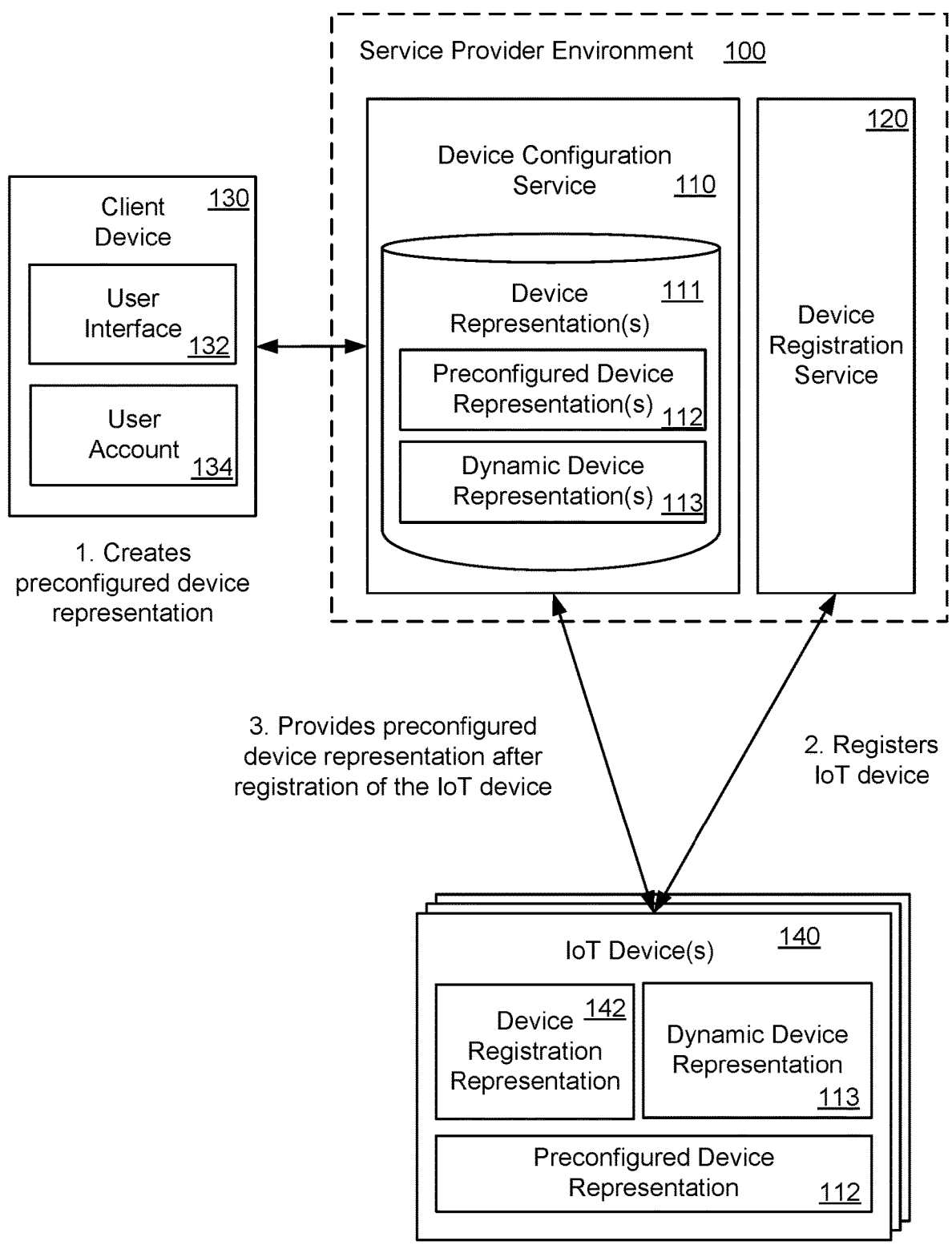
FIG. 1 illustrates a system and related operations for creating and providing device representations to an Internet of Things (IoT) device after a registration of the IoT device according to an example of the present technology.

A technology is described for creating device representations for an Internet of Things (IoT) device. The device representations may include preconfigured device representations and dynamic device representations. The preconfigured device representation may be created during a fulfillment phase of the IoT device, and then stored in a service provider environment. After a user is in possession of the IoT device, the IoT device may first generically register with the service provider environment and then receive a non-generic registration associated with a user account. The non-generic registration may enable the IoT device to retrieve the preconfigured device representation for installation on the IoT device. A dynamic device representation may be dynamically created as the IoT device registers with the service provider environment (or after the IoT device registers). The dynamic device representation may also be provided to the IoT device and installed on the IoT device.

In one configuration, a device configuration service that operates in the service provider environment may create the preconfigured device representation for the IoT device. The device configuration service may create the preconfigured device representation based on instructions received from a client computing device. For example, the client computing device may provide various device representation parameters and/or media content files, which may be used by the device configuration service when creating the preconfigured device representation for the IoT device. The preconfigured device representation may be associated with a specific user account. For example, the user account may be accessed using the client computing device, and then the preconfigured device representation may be created when a user is logged into the user account. The preconfigured device representation may include settings, parameters, media content files, drivers, proprietary instructions (e.g., custom scripts), configurations, etc. for the IoT device. The preconfigured device representation may include pairing information for pairing the IoT device with program code(s), services, or computing resources executing in the service provider environment. After creation of the preconfigured device representation, the preconfigured device representation may be stored at the device configuration service until the preconfigured device representation is retrieved by the IoT device.

In one example, the preconfigured device representation may be created during the fulfillment phase of the IoT device. For example, the preconfigured device representation may be created after the IoT device is purchased from an electronic marketplace or a retail store, but prior to the IoT device being in possession of the user that purchased the IoT device. The preconfigured device representation may be created when a purchase order is being processed by the electronic marketplace, or after the IoT device has shipped and is enroute to the user's location. In some cases, the preconfigured device representation may be created after the IoT device has been delivered to the user, but before the IoT device initially connects to the service provider environment.

In one configuration, after the IoT device is in the possession of the user that purchased the IoT device, the IoT device may be powered on and send a registration request message to a device registration service. The IoT device may send the registration request message using a device registration representation (e.g., a generic configuration) that is stored on the IoT device during a manufacturing process. For example, the device registration representation may include a uniform resource locator (URL) to enable communication with the device registration service. The device registration representation may include a unique identifier for the IoT device, such as a serial number or a media access control (MAC) address, and the unique identifier may indicate that the IoT device is an authentic device (e.g., not a device that was manufactured illegally). The registration request message may include an authentication certificate, and the device registration service may verify that the authentication certificate included in the registration request message is a valid authentication certificate. If the authentication certificate is valid, the device registration service may perform a device registration procedure with the IoT device to register the IoT device with the service provider environment. The device registration procedure may involve dynamically assigning a device identifier to the IoT device. In addition, during registration, the IoT device may be associated with a user account (e.g., the user account that was used when creating the preconfigured device representation).

In one example, the non-generic registration of the IoT device may cause the dynamic device representation to be dynamically created for the IoT device in the service provider environment. The dynamic device representation (e.g., a non-generic configuration) may be provided to the IoT device for installation on the IoT device. The non-generic registration may enable the IoT device to connect to other services that operate in the service provider environment (as opposed to the device registration representation which may only enable the IoT device to connect to the device registration service). Using the non-generic registration, the IoT device may also connect to the device configuration service and retrieve the preconfigured device representation that is stored for the IoT device. For example, the IoT device may send a request for the preconfigured device representation to the device configuration service, and the request may include the device identifier associated with the IoT device (i.e., the device identifier that was assigned to the IoT device during registration). The device configuration service may retrieve the preconfigured device representation from a data store based on the device identifier, and the preconfigured device representation may be provided to the IoT device for installation on the IoT device.

In one configuration, the installation of the preconfigured device representation on the IoT device may enable the IoT device to be paired with program codes that are executing in the service provider environment. In another configuration, the installation of the preconfigured device representation on the IoT device may enable the IoT device to provide media content that is included in the preconfigured device representation. The media content may include video, audio, images and/or digital text. Depending on the settings, parameters, media content files, configurations, etc. that are included in the preconfigured device representation for the IoT device, the IoT device may gain additional capabilities after the preconfigured device representation is installed on the IoT device.

FIG. 1 illustrates an exemplary system and related operations for creating and providing device representations 111 to an Internet of Things (IoT) device 140. The device representations 111 may include preconfigured device representations 112 and dynamic device representations 113. A device configuration service 110 in a service provider environment 100 may create a preconfigured device representation 112 for the IoT device 140, and the preconfigured device representation 112 may be stored at the device configuration service 110. The IoT device 140 may complete a registration procedure with a device registration service 120 (also known as an onboarding and provisioning service) in the service provider environment 100. During the registration procedure, a dynamic device representation 113 (e.g., a non-generic configuration) may be dynamically created for the IoT device 140, and the dynamic device representation 113 may be provided for installation on the IoT device 140. The IoT device 140 may also retrieve the preconfigured device representation 112 from the device configuration service 110. The preconfigured device representation 112 may be installed on the IoT device 140, and the preconfigured device representation 112 may augment the capabilities of the IoT device 140.

In one configuration, the device configuration service 110 may create the preconfigured device representation 112 based on instructions received from a client device 130. The preconfigured device representation 112 may be associated with a specific user account 134. For example, the user account 134 may be accessed using the client device 130, and then the preconfigured device representation 112 may be created when a user is logged into the user account 134. In one example, the client device 130, via a user interface 132, may select a plurality of device representation parameters. The user interface 132 may be provided on an electronic page, and the electronic page may be associated with an online retail store. The device representation parameters may include settings, configurations, variables, drivers, etc. for the IoT device 290. The client device 130, via the user interface 132, may select or upload media content files for the IoT device 290. Alternatively, the device representation parameters may include a pointer to media content files stored in a data store and/or service in the service provider environment 100. The device representation parameters and/or media content files may vary depending on a type of IoT device 140. Based on the device representation parameters, media content files, etc., the device configuration service 110 may create the preconfigured device representation 112 specifically for the IoT device 140. The preconfigured device representation 112 may be a computer file that incorporates the various settings, configurations, parameters, media content files, etc. selected and/or uploaded from the client device 130. The device configuration service 110 may locally store the preconfigured device representation 112 until later retrieved by the IoT device 140.

In one example, the preconfigured device representation 112 may be created during a fulfillment phase of the IoT device 140. For example, the preconfigured device representation 112 may be created after the IoT device 140 is purchased from an electronic marketplace, but prior to the IoT device 140 being in possession of a user that purchased the IoT device 140. The preconfigured device representation 112 may be created when a purchase order for the IoT device 140 is being processed by the electronic marketplace, or when the IoT device 140 has shipped and is enroute to the user's location. Alternatively, the preconfigured device representation 112 may be created after the IoT device 140 has been delivered to the user, but before the IoT device 140 initially connects to the service provider environment 100.

In some cases, processing the purchase order for the IoT device 140 and shipping the IoT device 140 may take up to several days. Therefore, rather than waiting until the user is in possession of the IoT device 140 to configure the IoT device 140, the preconfigured device representation 112 for the IoT device 140 may be created during a fulfillment phase of the IoT device 140 (e.g., before the IoT device 140 is delivered). As a result, after the user is in possession of the IoT device 140, the IoT device 140 may simply retrieve the preconfigured device representation 112 that has already been created specifically for the IoT device 140. This allows for increased efficiency since the time period between purchasing the IoT device 140 and delivering the IoT device 140 may be utilized to create the preconfigured device representation 112.

As a non-limiting example, the IoT device 140 may be a digital picture frame. The client device 130 may upload or select images via the user interface 132, and the preconfigured device representation 112 may be created to include the images. After the digital picture frame is delivered to the user, the preconfigured device representation 112 with the images may be retrieved by the digital picture frame. Rather than the user uploading the images to the digital picture frame after the picture frame is delivered, the user may create the preconfigured device representation 112 with the images ahead of time (e.g., when a purchase order is being processed or during a delivery phase of the digital picture frame). As a result, after the digital picture frame is delivered, the digital picture frame may simply retrieve the already-created preconfigured device representation 112 with the images.

As another non-limiting example, the IoT device 140 may be a baby mobile. The client device 130 may upload or select audio songs via the user interface 132, and the preconfigured device representation 112 may be created to include the audio songs. In one example, the user may record an audio song, and then upload the audio song via the user interface 132. After the baby mobile is delivered to the user, the preconfigured device representation 112 with the audio songs may be retrieved by the baby mobile.

As yet another non-limiting example, the IoT device 140 may be an IoT button. The IoT button may be a programmable hardware device, and the IoT button may be linked to an IoT user account. When pressed or clicked, the IoT button may trigger an execution of program code or program code function in the service provider environment 100, and the program code may be linked to the same IoT user account. The program code may be high level source code that is executable. The program code may include entire executable programs (e.g., including a main( ) function), independent functions or executable code snippets. The program code may be written or updated during a time period in which a purchase order for the IoT button is being processed and/or the IoT button is being delivered. The execution of the program code may result in various functions being performed. Non-limiting examples of such functions may include counting or tracking items, calling or alerting an individual, ordering services, providing feedback, unlocking or starting a vehicle, opening a garage door, controlling household appliances, accessing a service, launching a service, launching a computing instance, etc. The client device 130 may select device representation parameters via the user interface 132 for the preconfigured device representation 112, and the device representation parameters may be for pairing the IoT button with the program code in the service provider environment 100. After the IoT button is delivered to the user, the preconfigured device representation 112 with the device representation parameters that pair the IoT button with the program code may be retrieved by the IoT button.

As another non-limiting example, the IoT device 140 may be a health-related device, such as a connected toothbrush, heart rate monitor, blood pressure monitoring device, etc. The client device 130 may upload or select health care information for a user via the user interface 132, and the preconfigured device representation 112 may be created to include the health care information. After the health-related device is delivered to the user, the preconfigured device representation 112 with the health care information for the user may be retrieved by the health-related device.

In one configuration, after the IoT device 140 has been delivered, the IoT device 140 may be powered on and connected to a wireless local area network (WLAN) using appropriate network credentials in a device registration representation 142 (e.g., a generic configuration). After establishing a connection with the WLAN, the IoT device 140 may automatically initiate a procedure to be registered with the device registration service 120. For example, the IoT device 140 may send a registration request message to the device registration service 120. The registration request message may also indicate a type of IoT device 140. The IoT device 140 may be capable of sending the registration request message based on the device registration representation 142 installed on the IoT device 140. The device registration representation 142 may be installed during a manufacturing process of the IoT device 140, and the device registration representation 142 may include information that enables the IoT device 140 to connect to the device registration service 120. For example, the device registration representation 142 may include a uniform resource locator (URL) associated with the device registration service 120. The device registration representation 142 may limit the IoT device 140 to only connect to the device registration service 120. The device registration representation 142 may prevent the IoT device 140 from connecting to other services in the service provider environment, such as the device configuration service 110 that stores the preconfigured device representations 112.

In one configuration, the registration request message may be sent from the IoT device 140 to the device registration service 120 via a publisher-subscriber model or a request-response model. In the publisher-subscriber model, the registration request message may be published to a topic. The registration request message may remain on the topic until the registration request message is picked up by the device registration service 120. For example, the registration request message may remain on the topic indefinitely until the registration request message is picked up by the device registration service 120. In contrast, in the request-response model, the registration request message may expire if not picked up within a defined period of time (e.g., 3-4 seconds). In this case, the IoT device 140 may keep resending the registration request message until it is picked up by the device registration service 120. After the registration request message is picked up by the device registration service 120, the device registration procedure may be started between the IoT device 140 and the device registration service 120.

In one example, the registration request message sent by the IoT device 140 to the device registration service 120 may include an authentication certificate. The device registration service 120 may verify that the authentication certificate included in the registration request message is a valid authentication certificate. In other words, the device registration service 120 may verify an identity of the IoT device 140 based on the authentication certificate, and that the IoT device 140 is eligible to be registered with the service provider environment 100. After verification of the authentication certificate, the device registration service 120 may send a code to the IoT device 140. The code may include a bar code, a quick response (QR) code, a radio frequency (RF) identifier (ID), etc. The user may log into an IoT user account using the client device 130 and provide, scan, or otherwise capture the code, which may result in the IoT device 140 being claimed by the IoT user account. In other words, by providing the code, the user may show a possession of the IoT device 140 that the user is attempting to register with the device registration service 120, and an ownership of the IoT device 140 may be passed from the device registration service 120 to the IoT user account. The device registration procedure may involve dynamically assigning a device identifier (e.g., a unique identifier) to the IoT device 140 and providing a new non-generic certificate or token to enable access to services of the service provider environment 100. During registration, the IoT device 140 may also be associated with a user account 134 (e.g., the user account 134 that was used when creating the preconfigured device representation 112). In addition, the registration of the IoT device 140 may involve the device registration service 120 creating one or more IoT objects for the IoT device 140, and the IoT objects may be stored in a registry in the service provider environment 100. These IoT objects may include policy objects, shadow objects, IoT "thing" objects and certificate objects for the IoT device 140.

In one example, the dynamic device representation 113 may be dynamically created for the IoT device 140 during the device registration procedure. The device registration service 120 may send the dynamic device representation 113 (e.g., the non-generic configuration) to the IoT device 140. The dynamic device representation 113 may be stored along with the preconfigured device representation 112 in a data store that contains the device representations 111. The dynamic device representation 113 may be a non-generic configuration that replaces the device registration representation 142 (e.g., the generic configuration) that was previously installed on the IoT device 140. A non-generic device registration may enable the IoT device 140 to connect to other services that operate in the service provider environment 100, such as the device configuration service 110. In contrast, the device registration representation 142 may only enable the IoT device 140 to connect to the device registration service 120. When connecting to the device configuration service 110, the IoT device 140 may present a new authentication certificate, and the new authentication certificate may have been received at the IoT device 140 in response to the IoT device 140 sending an authentication certificate signing request (CSR) to the service provider environment 100 during the device registration procedure.

Using the non-generic device registration, the IoT device 140 may connect to the device configuration service 110 and retrieve the preconfigured device representation 112 that is stored for the IoT device 140 by the device configuration service 110. For example, the IoT device 140 may send a request for the preconfigured device representation 112 to the device configuration service 110, and the request may include the device identifier associated with the IoT device 140 (e.g., the device identifier that may have been assigned to the IoT device during registration). The device configuration service 110 may retrieve the preconfigured device representation 112 based on the device identifier, and the preconfigured device representation 112 may be provided to the IoT device 140 for installation on the IoT device 140. The installation of the preconfigured device representation 112 may augment the capabilities of the IoT device 140.

As a non-limiting example, if the IoT device 140 is a digital picture frame, the installation of the preconfigured device representation 112 may enable the IoT device to display certain images. As another non-limiting example, if the IoT device 140 is a baby mobile, the installation of the preconfigured device representation 112 may enable the IoT device to play certain audio content. As yet another non-limiting example, if the IoT device 140 is an IoT button, the installation of the preconfigured device representation 112 may cause certain program code(s) to be executed in the service provider environment 100 when a button on the IoT device 140 is pressed. The preconfigured device representation 112 may enable the user to personalize the IoT device 140.

In one configuration, the IoT device 140 may connect to the device configuration service 110 to retrieve the preconfigured device representation 112, and after the preconfigured device representation 112 is installed on the IoT device 140, the IoT device 140 may disconnect from the service provider environment 100. At a later time, the IoT device 140 may reconnect to the device configuration service 110 to retrieve an updated preconfigured device representation 112 for the IoT device 140. In other words, the IoT device 140 may or may not maintain a persistent connection with services that operate in the service provider environment 100.

In one configuration, the preconfigured device representation 112 may be applicable for multiple IoT devices 140. The multiple IoT devices 140 may be part of a predefined topology or predefined scene. For example, when creating the preconfigured device representation 112, the client device 130 may provide information regarding additional IoT devices 140 (e.g., existing IoT devices that are already in the home) that are expected to be in network proximity to a recently purchased IoT device 140. In other words, the client device 130 may provide information regarding the additional IoT devices 140 included in the predefined topology or predefined scene. The device configuration service 110 may create the preconfigured device representation 112 to incorporate the multiple IoT devices 140 based on the information received from the client device 130. As a non-limiting example, the preconfigured device representation 112 may be applicable to a smart lighting device that was recently purchased, as well as existing systems that interact with the smart lighting device.

In one example, the dynamic device representation 113 may include supplemental device representations (e.g., configuration files) for the IoT device 140. The supplemental device representations may be tailored to a type of IoT device 140. The supplemental device representations may include supplemental information that may be of interest to the IoT device 140. The supplemental information may further augment the capabilities provided by the preconfigured device representation 112 to the IoT device 140. For example, the supplemental device representations may include uniform resource locators (URLs) for locating firmware updates, weather information, traffic information, etc. depending on the type of IoT device 140. As another example, the supplemental device representations may include default states for the IoT device 140 in certain times or situations. As a non-limiting example, if the IoT device 140 is a smart thermostat, the supplemental device representations may instruct the IoT device 140 to be in a first state (e.g., a temperature setting of 70 degrees) in the morning, a second state (e.g., a temperature setting of 64 degrees) in the afternoon, and a third state (e.g., a temperature setting of 70 degrees) in the evening.

In another example, the supplemental device representations that are provided to the IoT device 140 may be selected based on a geographic location of the IoT device 140. For example, if the IoT device 140 is an automobile, depending on the geographical location of the IoT device 140 when the IoT device 140 performs the registration procedure, the supplemental device representation may include specific automobile parameters that are tailored to the geographical location of the IoT device 140. These automobile parameters may be based on altitude, terrain, predicted climate, etc.

In another example, the IoT device 140 may share the preconfigured device representation 112 with additional IoT devices that are located in proximity to the IoT device 140. The preconfigured device representation 112 may be shared between the IoT devices using an appropriate communication protocol, such as Bluetooth. The IoT device may only share the preconfigured device representation 112 after the additional IoT devices have been registered with the device registration service 120. In other words, when the additional IoT devices have not registered with the device registration service 120, the preconfigured device representation 112 may be unusable.

Figure 2:
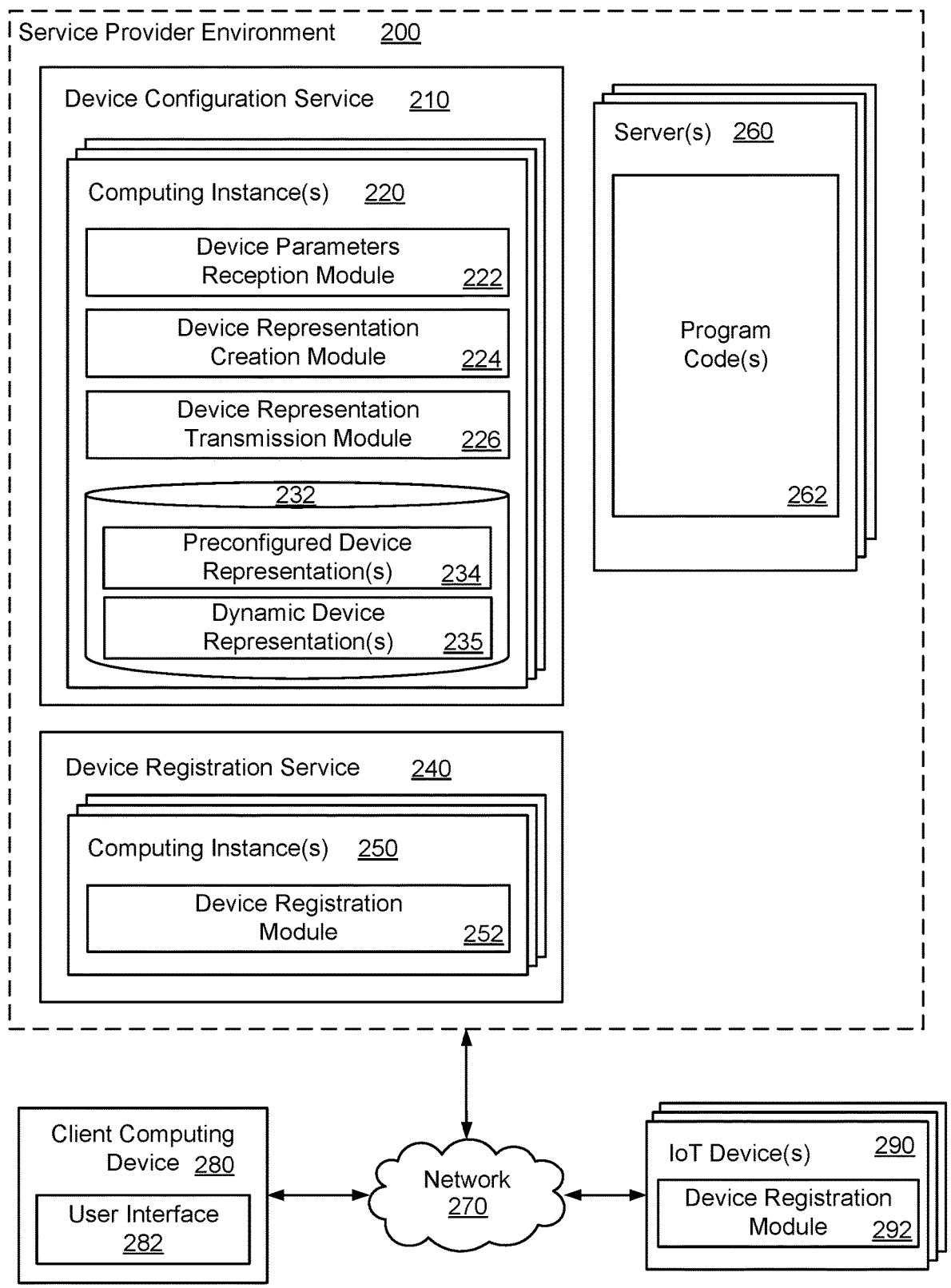
FIG. 2 is an illustration of a networked system for creating preconfigured device representations according to an example of the present technology.

FIG. 2 illustrates components of an example service provider environment 200 according to one example of the present technology. The service provider environment 200 may include a device configuration service 210, a data registration service 240, and servers 260 that execute program code 262. The device configuration service 210 may operate one or more computing instances 220 and data store(s) 232 to create device representations for an Internet of Things (IoT) device 290. The device representations may include preconfigured device representations 234 and dynamic device representations 235. The device configuration service 210 may provide the preconfigured device representation 234 to the IoT device 290 via a network 270. The device registration service 240 may operate one or more computing instances 250 to perform a device registration procedure that registers the IoT device 290 with the service provider environment 200. The device registration service 240 may register the IoT device 290 via the network 270. In addition, the device configuration service 210 may be in communication with a client computing device 280 via the network 270. For example, the client computing device 280 may select various device representation parameters for creation of the preconfigured device representation 234.

In one example, the data store 232 maintained by the device configuration service 210 may include the preconfigured device representations 234. A preconfigured device representation 234 may be installed on the IoT device 290 in order to augment a capability of the IoT device 290. The preconfigured device representation 234 may be a file that includes various settings, parameters, media content files, configurations, etc., and the preconfigured device representation 234 may be dedicated to a specific IoT device 290. As an example, the preconfigured device representation 234 may include various settings, parameters, configurations, etc. that pair the IoT device 290 to the one or more program codes 262, services, or computing resources that execute in the service provider environment 200. For example, the IoT device may be paired with computing (e.g., computing instances), storage (e.g., object storage, NoSQL data stores, etc.), networking (e.g., virtual routers), database resources (e.g., Hadoop clusters), and development resources in a service provider environment. As another example, the preconfigured device representation 234 may include various types of media content files, such as images, audio files, video files, etc. As yet another example, the preconfigured device representation 234 may include executable files that are installable on the IoT device 290.

In one example, the data store 232 maintained by the device configuration service 210 may include the dynamic device representations 235. A dynamic device representation 235 may be a non-generic device configuration that is dynamically created for the IoT device 290 when the IoT device 290 registers with the device registration service 240. The dynamic device representation 235 may not be present until the IoT device 290 initiates the registration procedure or at some point after the registration. The non-generic registration may enable the IoT device 290 to connect to various services in the service provider environment 200. For example, the non-generic registration may enable the IoT device 290 to retrieve the preconfigured device representation 234 from the device configuration service 210. In addition, the dynamic device representation 235 may include supplemental representations that augment the capabilities of the IoT device 290. The supplemental device representations may be tailored to a type of IoT device 290. In other words, the supplemental device representations may be selected depending on the type of IoT device 290 (e.g., thermostat, farm equipment).

The computing instance(s) 220 operated by the device configuration service 210 may include a number of modules for creating and providing the preconfigured device representations 234. The computing instance(s) 220 may include a device parameters reception module 222, a device representation creation module 224, a device representation transmission module 226, and other applications, services, processes, systems, engines, or functionality not discussed in detail herein. In addition, the computing instance(s) 220 may run on one or more computing devices in the service provider environment 200.

The device parameters reception module 222 may be configured to receive a plurality of device representation parameters for an IoT device 290. The device representation parameters may be received from the client computing device 280. For example, the device representation parameters may be selected or uploaded via a user interface 282 on the client computing device 280. The device representation parameters may include settings, configurations, etc. for the IoT device 290. In addition, the device parameters reception module 222 may receive media content files from the client computing device 280 via the user interface.

The device representation creation module 224 may be configured to create the preconfigured device representation 234 for the IoT device 290 based on the plurality of device representation parameters. In other words, the preconfigured device representation 234 for the IoT device 290 may include the various settings, parameters, media content files, configurations, etc. provided from the client computing device 280. The preconfigured device representation 234 may be stored in the data store 232 associated with the device configuration service 210, and the preconfigured device representation 234 may be held until retrieved by the IoT device 290. In one configuration, the device representation creation module 224 may create the preconfigured device representation 234 before the IoT device 290 registers with the service provider environment 200, and the IoT device 290 may or may not be in possession of a user that purchased the IoT device 290. For example, the preconfigured device representation 234 may be created when the IoT device 290 is being shipped to the user that purchased the IoT device 290).

The device representation transmission module 226 may be configured to transmit the preconfigured device representation 234 to the IoT device 290. The device representation transmission module 226 may transmit the preconfigured device representation 234 after the IoT device 290 is registered with the device registration service 240. In one example, the device representation transmission module 226 may receive a request for the preconfigured device representation 234 from the IoT device 290, and the request may include a device identifier associated with the IoT device 290. The device representation transmission module 226 may retrieve the preconfigured device representation 234 from the data store 232 based on the device identifier, and then provide the preconfigured device representation 234 to the IoT device 290 for installation on the IoT device 290.

The computing instance(s) 250 operated by the device registration service 240 may include a device registration module 252. The device registration module 252 may be configured to receive a registration request message from the IoT device 290. The registration request message may be sent based on a device registration representation (e.g., generic configuration) that is installed on the IoT device 290. The registration request message may include an authentication certificate. The device registration module 252 may verify that the authentication certificate included in the registration request message received from the IoT device 290 is a valid authentication certificate. If the authentication certificate is valid, the device registration module 252 may perform a device registration procedure to register the IoT device 290 with the service provider environment 200. During the device registration procedure, the IoT device 290 may be assigned the device identifier. The device registration module 252 may provide non-generic registration to the IoT device 290, and the non-generic registration may enable the IoT device 290 to connect to the device configuration service 210 to retrieve the preconfigured device representation 234 or the dynamic device representation 232. In addition, the computing instance(s) 250 that operate the device registration service 240 may run on one or more computing devices in the service provider environment 200.

The client computing device 280 may comprise a computer system that is embodied in the form of a desktop computer, a laptop computer, mobile devices, cellular telephones, smartphones, set-top boxes, network-enabled televisions, tablet computer systems, or other devices with like capability.

The IoT device 290 may include a device registration module 292 configured to send, to the device registration service 240, the registration request message that includes an authentication certificate. The device registration module 292 may communicate to the device registration service 240 after the IoT device 290 is powered on based on the device registration representation that is pre-installed on the IoT device 290 during a manufacturing process, and the device registration representation may include a uniform resource locator (URL) of the device registration service 210. The device registration module 292 may perform a device registration procedure with the device registration service 240, such that the IoT device 290 may become registered with the service provider environment 200.

The IoT device 290 may be configured to send, to the device configuration service 210, a request for the preconfigured device representation 234 after a registration of the IoT device 290 is completed. The IoT device 290 may communicate to the device configuration service 210 after the IoT device 290 is registered and receives the non-generic registration. The IoT device 290 may receive the preconfigured device representation 234 from the device configuration service 210, and the preconfigured device representation 234 may be installed on the IoT device 290.

The IoT device 290 may comprise, for example a processor-based system such as a computing system. As non-limiting examples, the IoT device 290 may include consumer products (e.g., rice cookers, printers, scanners, digital picture frames, toys), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 270. Commercial devices may also be included in the definition of the IoT device 290, including: commercial printing presses, commercial freezers, commercial kilns, commercial mixers or other commercial equipment.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 270 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
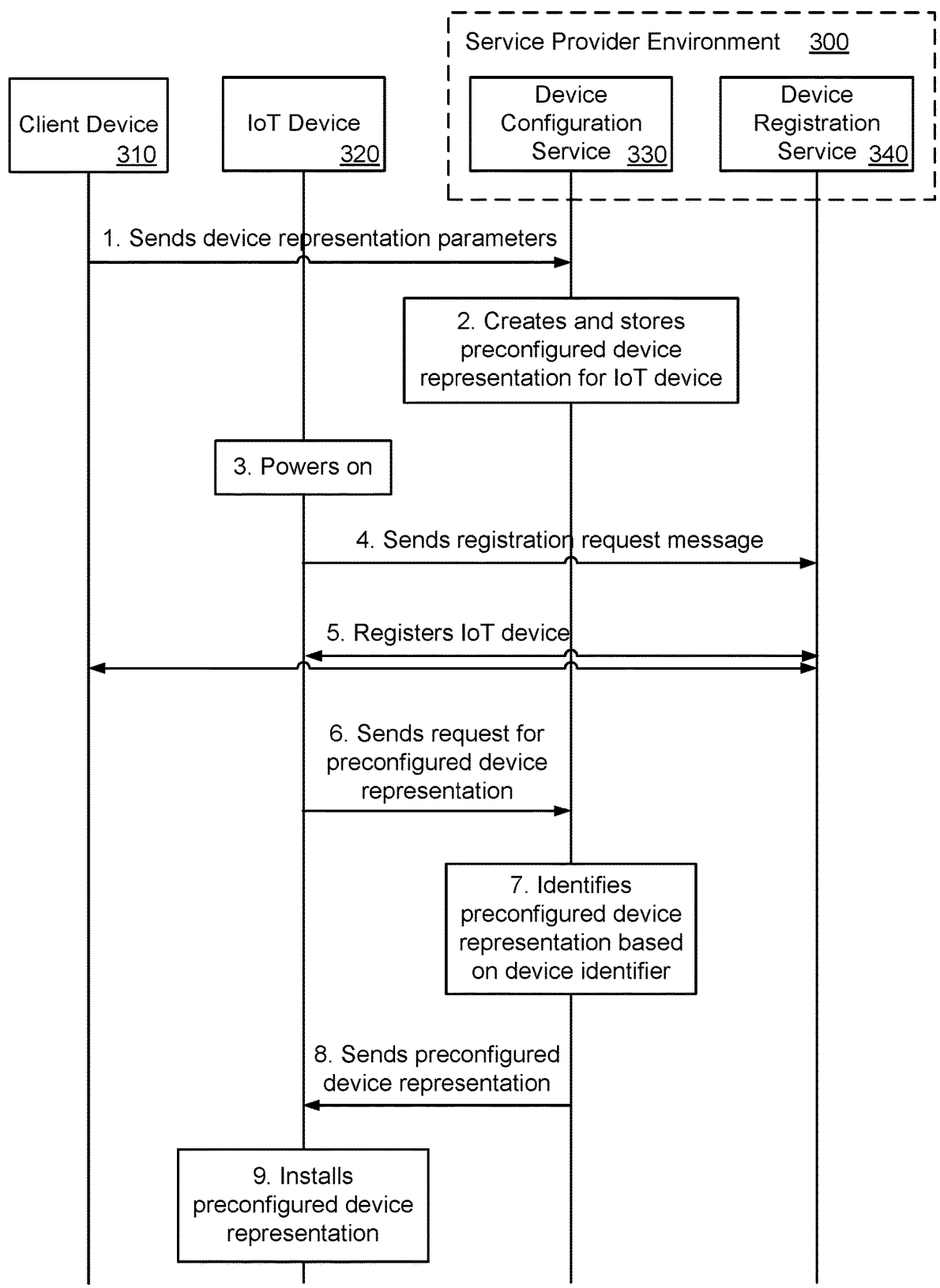
FIG. 3 illustrates operations for creating and providing device representations to an Internet of Things (IoT) device after a registration of the IoT device according to an example of the present technology.

FIG. 3 illustrates operations for creating and providing device representations to an Internet of Things (IoT) device 320. The device representations may include preconfigured device representations and dynamic device representations. The preconfigured device representation may be created by a device configuration service 330 operating in the service provider environment 300, and the preconfigured device representation may be created before the IoT device 320 is registered with a device registration service 340 in the service provider environment 300. The preconfigured device representation may be installed on the IoT device 320 after registration to augment the capabilities of the IoT device 320.

In a first step, a client device 310 may send various device representation parameters to a device configuration service 300 that operates in a service provider environment 300. The device representation parameters may include settings, configurations, parameters, etc. for the IoT device 320. In one example, a user associated with the client device 310 may select the device representation parameters via a user interface on the client device 310, and then the device representation parameters may be sent from the client device 310 to the device configuration service 330. For example, the user interface may be provided when a user purchases the IoT device 320 from an electronic marketplace. In other words, the user interface may be provided by a merchant that is offering the IoT device 320 for sale.

In a second step, the device configuration service 330 may receive the device representation parameters. The device configuration service 330 may create the preconfigured device representation for the IoT device 320 using the device representation parameters. For example, the preconfigured device representation may be a file that incorporates the device representation parameters. The preconfigured device representation may be stored at the device configuration service 330 until the preconfigured device representation is later retrieved by the IoT device 320. In one example, the preconfigured device representation may be associated with a specific user account. For example, the user account may be accessed using the client device 310, and then the preconfigured device representation may be created when a user is logged into the user account.

In a third step, the IoT device 320 may be powered on. The IoT device 320 may be powered on after being received by the user. In other words, the IoT device 320 may initially power on for a first time after being delivered to the user.

In a fourth step, the IoT device 320 may send a registration request message to the device registration service 340. The IoT device 320 may send the registration request message based on a device registration representation (e.g., a generic configuration) that is installed on the IoT device 320 during a manufacturing process. For example, the device registration representation may include a uniform resource locator (URL) address of the device registration service 340. In addition, the device registration representation may include a unique identifier for the IoT device 320, such as a serial number of a media access control (MAC) address, and the unique identifier may indicate that the IoT device 320 is an authentic device. Using the device registration representation, the IoT device 320 may send the registration request message to the device registration service 340. The registration request message may indicate the type of IoT device (e.g., toy, digital picture frame, thermostat), and the registration request message may include an authentication certificate.

In a fifth step, the IoT device 320 and the device registration service 340 may perform a device registration procedure to register the IoT device 320 with the service provider environment 300. For example, the device registration service 340 may verify a validity of the authentication certificate provided by the IoT device 320 in the registration request message. In other words, the device registration service 340 may verify an identity of the IoT device 320 based on the authentication certificate, and that the IoT device 320 is eligible to be registered with the service provider environment 300. After verification of the authentication certificate, the device registration service 340 may send a code to the IoT device 320. The user may log into the user account using the client device 310 and provide the code, which may result in the IoT device 320 being claimed by the user account. As a result, the user account may be paired with the IoT device 320. In other words, the device registration procedure may involve dynamically assigning a device identifier (e.g., a unique identifier) and a non-generic certificate to the IoT device 320, and during registration, the IoT device 320 may be associated with the user account that was used when creating the preconfigured device representation).

Furthermore, if the IoT device 320 is successfully registered, the device registration service 340 may provide a non-generic registration (e.g., a new certificate) to the IoT device 320. The non-generic registration may enable the IoT device 320 to connect to other services in the service provider environment 300, such as the device configuration service 330 that is storing the preconfigured device representation for the IoT device 320.

In a sixth step, the IoT device 320 may send a request for the preconfigured device representation to the device configuration service 330. The IoT device 320 may send the request based on the non-generic registration installed on the IoT device 320. In other words, the IoT device 320 may send the request after the device registration procedure is completed. In addition, the request may include a device identifier associated with the IoT device 320.

In a seventh step, the device configuration service 330 may receive the request for the preconfigured device representation with the device identifier from the IoT device 320. The device configuration service 330 may identify the preconfigured device representation for the IoT device 320 from a data store based on the device identifier.

In an eight step, the device configuration service 330 may send the preconfigured device representation to the IoT device 320. The preconfigured device representation may include settings, parameters, media files, configurations, etc. for the IoT device 320.

In a ninth step, the IoT device 320 may install the preconfigured device representation received from the device configuration service 330. The installation of the preconfigured device representation may augment the capabilities of the IoT device 320. For example, the preconfigured device representation may enable the IoT device 320 to provide media content (e.g., images, songs). As another example, the preconfigured device representation may enable the IoT device 320 to be paired with program codes that execute in the service provider environment 300.

Figure 4:
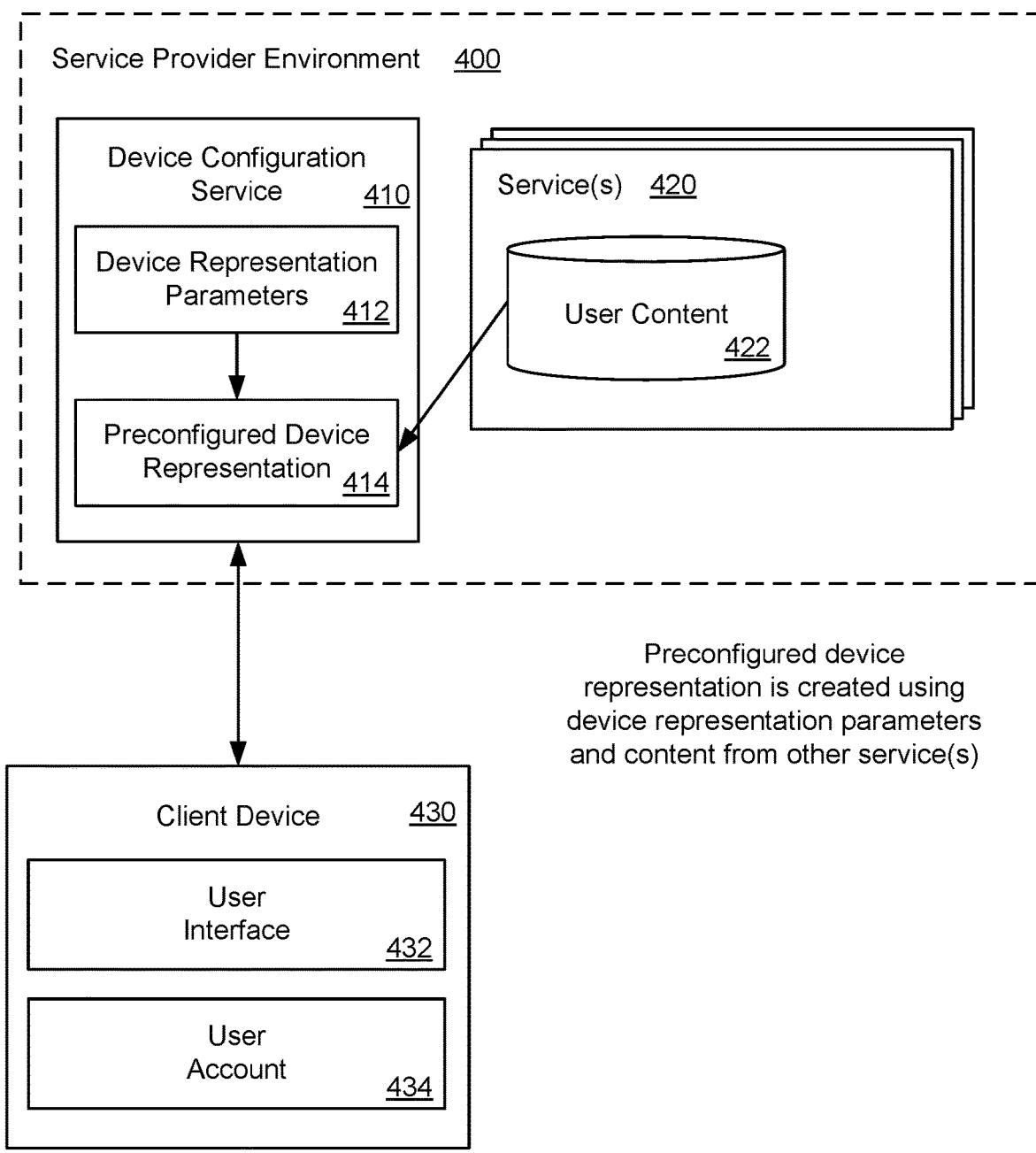
FIG. 4 illustrates a system and related operations for creating a preconfigured device representation for an Internet of Things (IoT) device based on device representation parameters and media content from one or more services operating in a service provider environment according to an example of the present technology.

FIG. 4 illustrates an exemplary system and related operations for creating a preconfigured device representation 414 for an Internet of Things (IoT) device using a device configuration service 410 operating in a service provider environment 400. The preconfigured device representation 414 may be created based on instructions received from a client device 430 via a user interface 432. More specifically, the preconfigured device representation 414 may be created based on device representation parameters 412 selected or uploaded from the client device 430 and/or user content 422 from one or more services 420 operating in a service provider environment 400. The services 420 may include music streaming services, photo sharing applications, video streaming services, electronic book services, health care services, etc. that provide the user content 422. The user content 422 may include media content, health care records, etc. The services 420 may be paired with a user account 434 associated with the client device 430.

In one configuration, the user interface 432 may enable the client device 430 to select or upload the device representation parameters 412. The device representation parameters 412 may include settings, configurations, parameters, etc. to be included in the preconfigured device representation 414. The user interface 432 may enable the client device 430 to select or upload user content 422 for incorporation into the preconfigured device representation 414. The user content 422 may be associated with the services 420 operating in the service provider environment 400. The user content 422 may include images, video files, audio files, text files, executable files, etc. Since the client device 430 may already be interacting with the services 420, the client device 430 may have an option to incorporate the user content 422 into the preconfigured device representation 414 created for the IoT device. The user content 422 may be added to the preconfigured device representation 414 (i.e., media content files may be added to the preconfigured device representation 414), or alternatively, the preconfigured device representation 414 may include a pointer to the user content 422 maintained by the services 420. The installation of the preconfigured device representation 414 may enable the user content 422 to be pushed onto an IoT device that installs the preconfigured device representation 414. Therefore, using the device representation parameters 412 and/or the user content 422, the device configuration service 410 may create the preconfigured device representation 414.

Figure 5:
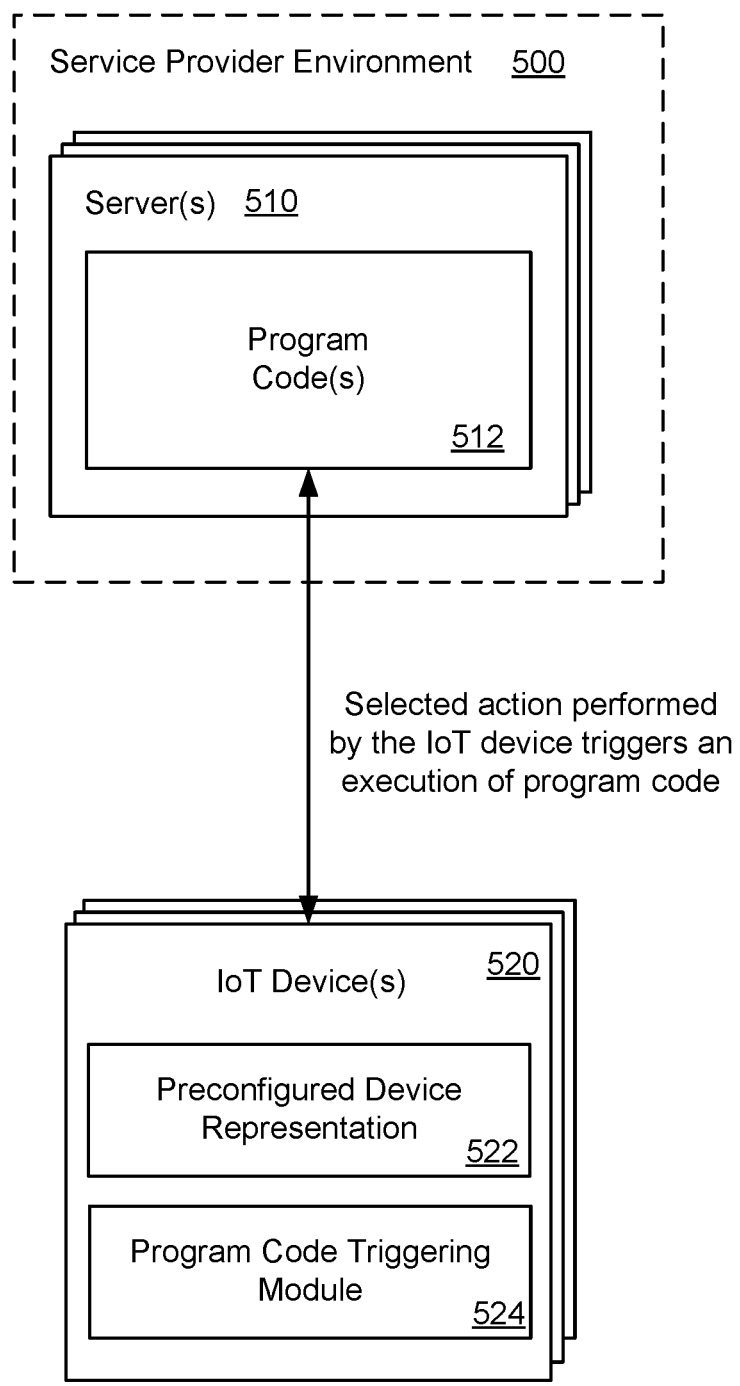
FIG. 5 illustrates a system and related operations for triggering an execution of program code in a service provider environment based on a preconfigured device representation installed on an Internet of Things (IoT) device according to an example of the present technology.

FIG. 5 illustrates an exemplary system and related operations for triggering an execution of program code 512 in a service provider environment 500 based on a preconfigured device representation 522 installed on an Internet of Things (IoT) device 520. The program code 512 may be executed on a server 510 in the service provider environment 500. The program code 512 may be executed on the server 510 based on instructions from a program code triggering module 524 on the IoT device 520. In other words, based on certain actions that occur on the IoT device 520, the program code triggering module 524 may trigger the execution of the program code 512. In some cases, the execution of the program code 512 may produce an output, and the output may be provided to the IoT device 520.

In one example, after the preconfigured device representation 522 is installed on the IoT device 520, the program code triggering module 524 may detect when a button is clicked or pressed on the IoT device 520, and the program code triggering module 524 may trigger the execution of the program code 512. As non-limiting examples, the execution of the program code 512 may result in the following functions: counting or tracking items, calling or alerting an individual, ordering services, providing feedback, unlocking or starting a vehicle, opening a garage door, controlling household appliances (e.g., media players, light bulbs), etc.

In another example, after the preconfigured device representation 522 is installed on the IoT device 520, the program code triggering module 524 may detect when an image or video is captured by the IoT device 520 and uploaded to a storage service that operates in the service provider environment 500. The execution of the program code 512 may cause the image or video to be enhanced using appropriate software tools.

In yet another example, after the preconfigured device representation 522 is installed on the IoT device 520, the program code triggering module 524 may detect when sensor data is captured by the IoT device 520 and uploaded to the service provider environment 500. The execution of the program code 512 may result in the detection of trends and/or anomalies in the sensor data.

Figure 6:
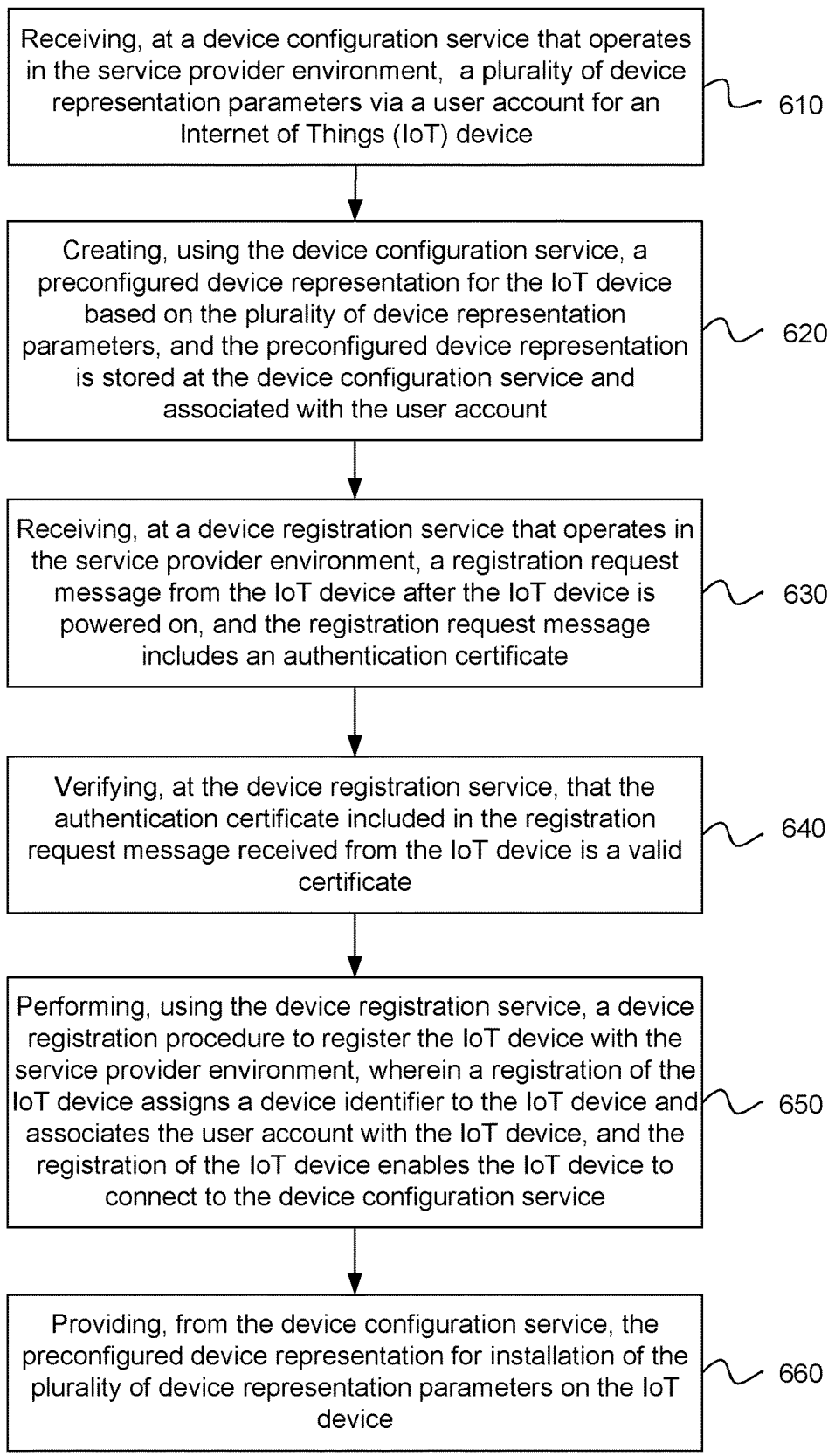
FIG. 6 is a flowchart of an example method for creating preconfigured device representations in a service provider environment.

FIG. 6 illustrates an example of a method for providing preconfigured device representations in a service provider environment. A plurality of device representation parameters may be received for an Internet of Things (IoT) device via a user account, as in block 610. The plurality of device representation parameters may be received at a device configuration service that operates in the service provider environment. The device representation parameters may be received, for example, from a client computing device.

A preconfigured device representation may be created for the IoT device, as in block 620. The preconfigured device representation may be created using the device configuration service. The preconfigured device representation may be created based on the plurality of device representation parameters. The preconfigured device representation may include various settings, parameters, media content files, configurations, etc. for the IoT device. The preconfigured device representation may be stored at the device configuration service. In addition, the preconfigured device representation may be associated with the user account.

A registration request message may be received from the IoT device after the IoT device is powered on, as in block 630. For example, the registration request message may be received after the IoT device is powered on for a first time. The registration request message may be received at a device registration service that operates in the service provider environment. The registration request message sent by the IoT device may include an authentication certificate. The authentication certificate may be stored on the IoT device during a manufacturing process.

The authentication certificate included in the registration request message received from the IoT device may be verified as being a valid authentication certificate, as in block 640. The authentication certificate may be verified at the device registration service. In other words, the device registration service may verify an identity of the IoT device based on the authentication certificate, and that the IoT device is eligible to be registered with the service provider environment.

A device registration procedure may be performed to register the IoT device with the service provider environment, as in block 650. The device registration procedure may be performed using the device registration service. The device registration service may connect to the IoT device based on a device registration representation that is pre-installed on the IoT device during the manufacturing process. The device registration representation may include a uniform resource locator (URL) associated with the device registration service.

In one example, a registration of the IoT device may enable the IoT device to connect to the device configuration service. More specifically, the registration of the IoT device may cause a non-generic registration to be installed on the IoT device. The non-generic registration may enable the IoT device to connect to the device configuration service and retrieve the preconfigured device representation. In addition, the registration of the IoT device may assign a device identifier to the IoT device and associate the user account with the IoT device (e.g., the same user account that was used when creating the preconfigured device representation).

The preconfigured device representation may be provided for installation of the plurality of device representation parameters on the IoT device, as in block 660. The preconfigured device representation may be provided from the device configuration service to the IoT device. In one example, the installation of the preconfigured device representation on the IoT device may enable the IoT device to be paired with program codes that are executing in the service provider environment.

In one example, a request for the preconfigured device representation may be received from the IoT device. The request may include the device identifier assigned to the IoT device during the registration of the IoT device. The preconfigured device representation may be identified from a data store based on the device identifier. The preconfigured device representation may be provided to the IoT device for installation on the IoT device.

Figure 7:
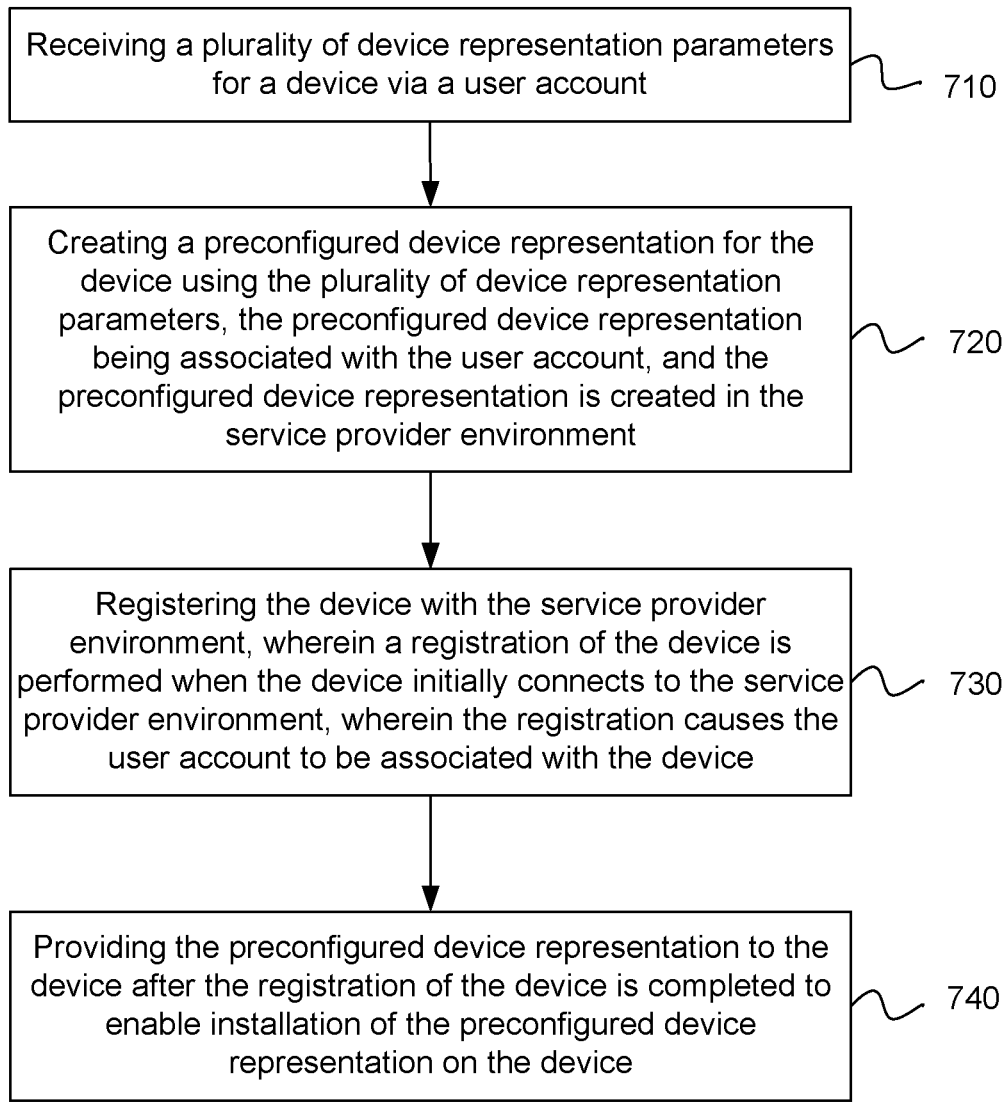
FIG. 7 is a flowchart of another example method for creating preconfigured device representations in a service provider environment.

FIG. 7 illustrates an example of a method for providing preconfigured device representations in a service provider environment. A plurality of device representation parameters may be received for a device via a user account, as in block 710. For example, the device representation parameters may be received from a client computing device at a device configuration service that operates in the service provider environment.

A preconfigured device representation may be created for the device using the plurality of device representation parameters, as in block 720. The preconfigured device representation may be created in the service provider environment, and the preconfigured device representation may be associated with the user account. In one example, the preconfigured device representation may be created after the device is purchased and before the device initially connects to the service provider environment. In another example, the preconfigured device representation may be created for the device during a fulfillment phase of the device, and the preconfigured device representation may be stored at the device configuration service until the preconfigured device representation is retrieved by the device.

The device may be registered with the service provider environment, as in block 730. A registration of the device may be performed when the device initially connects to the service provider environment. The registration may assign a device identifier to the device and associate the user account with the device. In other words, during registration, the device may be associated with the same user account that was used when creating the preconfigured device representation. In one example, a registration request message may be received from the device after the device is powered on and initially connects to the service provider environment, and the registration request message may be sent from the device using a publisher-subscriber model or a request-response model.

The preconfigured device representation may be provided for installation on the device, as in block 740. The preconfigured device representation may be provided after the registration of the device is completed. In one example, the installation of the preconfigured device representation on the IoT device may enable the IoT device to be paired with program codes that are executing in the service provider environment. In another example, the installation of the preconfigured device representation on the device may enable the device to provide media content that is included in the preconfigured device representation.

In one example, a user interface may be provided that enables entry of the plurality of device representation parameters for the device. The user interface may offer a predefined set of available device representation parameters depending on a type of device. The available device representation parameters may include settings, parameters, media content files, drivers, proprietary instructions (e.g., custom scripts), configurations, etc. for the device. Using the user interface, a user may select appropriate device representation parameters for the device from the predefined set of available device representation parameters. In another example, a user interface may be provided that enables one or more media content files to be uploaded or selected, and the media content files may be integrated with the preconfigured device representation for the device.

In one configuration, information may be received regarding additional devices that are expected to be in network proximity to the device. The preconfigured device representation may be created to incorporate the device and the additional devices. In another configuration, a request for the preconfigured device representation may be received from the device. The preconfigured device representation may be identified from a data store based on the device identifier.

In one configuration, supplemental device representations may be provided to the device after the registration of the device is completed, and the supplemental device representations may be tailored to a type of device. In other words, the supplemental device representations may be selected depending on the type of device (e.g., thermostat, farm equipment). The supplemental device representations may include supplemental information that may be of use to the device. The supplemental information may further augment the capabilities provided by the preconfigured device representation to the IoT device.

In another configuration, the preconfigured device representation may be shared between the device and an additional device that has been registered with the device registration service, and the additional device may be within a defined distance from the device. The preconfigured device representation may be shared between the IoT devices using an appropriate communication protocol, such as Bluetooth or WiFi. The additional device that receives the preconfigured device representation may then install and utilize the preconfigured device representation.

Figure 8:
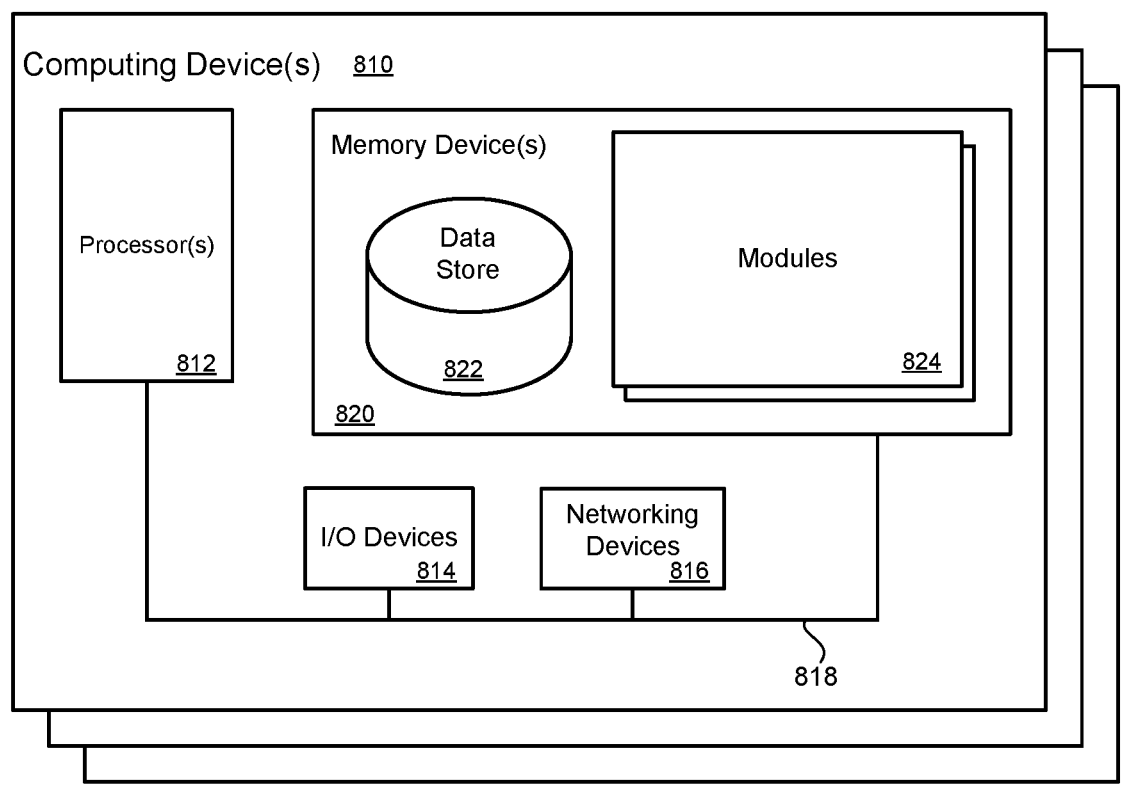
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 (or micro controllers) that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices.

Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

Figure 9:
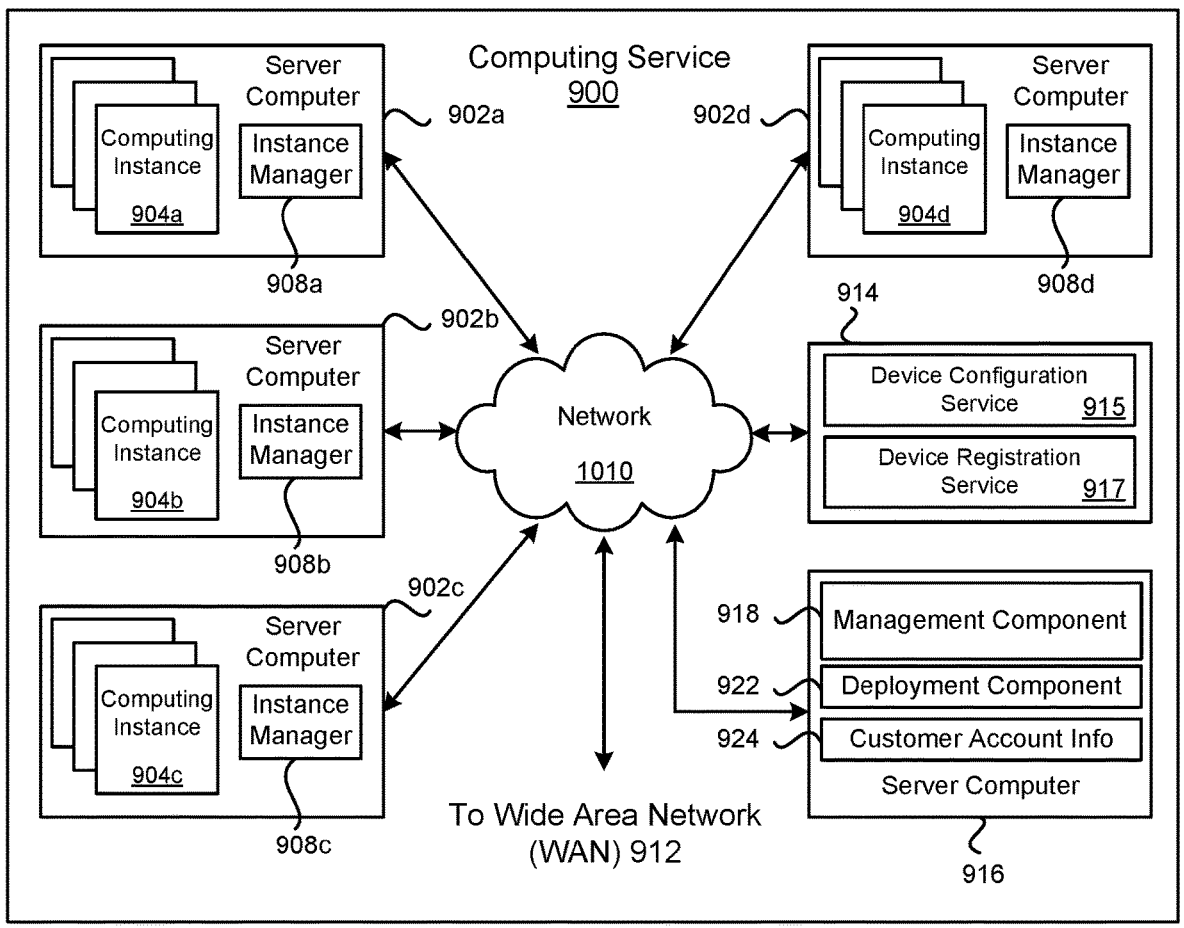
FIG. 9 is a block diagram of a service provider environment according to an example of the present technology.

FIG. 9 is a block diagram illustrating an example computing service 900 that may be used to execute and manage a number of computing instances 904*a-d* upon which the present technology may execute. In particular, the computing service 900 depicted illustrates one environment in which the technology described herein may be used. The computing service 900 may be one type of environment that includes various virtualized service resources that may be used, for instance, to host computing instances 904*a-d*.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902*a-d*. The server computers 902*a-d* may also be known as physical hosts. While four server computers are shown, any number may be used, and large data centers may include thousands of server computers. The computing service 900 may provide computing resources for executing computing instances 904*a-d*. Computing instances 904*a-d* may, for example, be virtual machines. A virtual machine may be an instance of a software implementation of a machine (i.e. a computer) that executes applications like a physical machine. In the example of a virtual machine, each of the server computers 902*a-d* may be configured to execute an instance manager 908*a-d* capable of executing the instances. The instance manager 908*a-d* may be a hypervisor, virtual machine manager (VMM), or another type of program configured to enable the execution of multiple computing instances 904*a-d* on a single server. Additionally, each of the computing instances 904*a-d* may be configured to execute one or more applications.

A server 914 may be reserved to execute software components for implementing the present technology or managing the operation of the computing service 900 and the computing instances 904*a-d*. For example, the server computer 914 may execute a device configuration service 915 and a device registration service 917. The device configuration service 915 may receive a plurality of device representation parameters for an Internet of Things (IoT) device. The device configuration service 915 may create a preconfigured device representation for the IoT device based on the plurality of device representation parameters. The device registration service 917 may receive a registration request message from the IoT device after the IoT device is powered on, and the registration request message may include an authentication certificate. The device registration service 917 may verify that the authentication certificate included in the registration request message received from the IoT device is a valid authentication certificate. The device registration service 917 may perform a device registration procedure that registers the IoT device with the computing service 900. The registration of the IoT device may enable the IoT device to connect to the device configuration service 915. The device configuration service 915 may provide the preconfigured device representation to the IoT device.

A server computer 916 may execute a management component 918. A customer may access the management component 918 to configure various aspects of the operation of the computing instances 904*a-d* purchased by a customer. For example, the customer may setup computing instances 904*a-d* and make changes to the configuration of the computing instances 904*a-d*.

A deployment component 922 may be used to assist customers in the deployment of computing instances 904*a-d*. The deployment component 922 may have access to account information associated with the computing instances 904*a-d*, such as the name of an owner of the account, credit card information, country of the owner, etc. The deployment component 922 may receive a configuration from a customer that includes data describing how computing instances 904*a-d* may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. An Internet of Things (IoT) device comprising:
a processor; and
a memory device including a data store to store instructions that, when executed by the processor, cause the processor to:
   send a registration request message that includes an authentication certificate to a device registration service that operates in a service provider environment;
   perform a device registration with the device registration service to register the IoT device with the service provider environment, wherein the device registration associates the IoT device with a user account and installs a dynamic device representation on the IoT device, wherein the dynamic device representation includes a non-generic security certificate that allows the IoT device to connect to a device configuration service located in the service provider environment;
   using the non-generic security certificate, connect to the device configuration service to obtain a preconfigured device representation after the device registration of the IoT device is completed, the preconfigured device representation being associated with the user account and including a plurality of device representation parameters;
   receive the preconfigured device representation from the device configuration service; and
   install the preconfigured device representation on the IoT device.

2. The IoT device of claim 1, wherein installation of the preconfigured device representation on the IoT device enables the IoT device to be paired with program codes that are executing in the service provider environment.

3. The IoT device of claim 1, wherein installation of the preconfigured device representation on the IoT device enables the IoT device to provide media content to be included in the preconfigured device representation.

4. The IoT device of claim 1, wherein the preconfigured device representation is created for the IoT device during a fulfillment phase of the IoT device, and the preconfigured device representation is stored at the device configuration service until the preconfigured device representation is retrieved by the IoT device.

5. The IoT device of claim 1, wherein the IoT device is configured to connect to the device registration service after being powered on using a device registration representation that is pre-installed on the IoT device during a manufacturing process, the device registration representation including a uniform resource locator (URL) that enables the IoT device to connect to the device registration service.

6. The IoT device of claim 1, wherein the dynamic device representation includes supplemental representations associated with an IoT device type, and the supplemental representations are installed on the IoT device to augment capabilities of the IoT device that are associated with the IoT device type.

7. The IoT device of claim 1, wherein the instructions, when executed by the processor, cause the processor to share the preconfigured device representation with an additional IoT device that has been registered with the device registration service, wherein the additional IoT device is within a defined distance from the IoT device.

8. A method, comprising:
sending a registration request message that includes an authentication certificate to a device registration service that operates in a service provider environment;
performing a device registration with the device registration service to register a device with the service provider environment, wherein the device registration associates the device with a user account and installs a dynamic device representation on the device, wherein the dynamic device representation includes a non-generic security certificate that allows the device to connect to a device configuration service located in the service provider environment;
connecting to the device configuration service using the non-generic security certificate to obtain a preconfigured device representation after the device registration of the device is completed the preconfigured device representation being associated with the user account; and
receiving the preconfigured device representation from the device configuration service.

9. The method of claim 8, further comprising installing the preconfigured device representation on the device to enable the device to be paired with program codes that are executing in the service provider environment.

10. The method of claim 8, further comprising installing the preconfigured device representation on the device to enable the device to provide media content to be included in the preconfigured device representation.

11. The method of claim 8, wherein the preconfigured device representation is created for the device during a fulfillment phase of the device, and the preconfigured device representation is stored at the device configuration service until the preconfigured device representation is retrieved by the device.

12. The method of claim 8, further comprising connecting to the device registration service after being powered on using a device registration representation that is pre-installed on the device during a manufacturing process, the device registration representation including a uniform resource locator (URL) that enables the device to connect to the device registration service.

13. The method of claim 8, further comprising:
receiving supplemental representations associated with a type of the device; and
installing the supplemental representations on the device to augment capabilities of the device associated with the type of the device.

14. The method of claim 8, further comprising sharing the preconfigured device representation with an additional device that has been registered with the device registration service, wherein the additional device is within a defined distance from the device.

15. A non-transitory machine readable storage medium having instructions embodied thereon, wherein the instructions when executed by one or more processors, cause the one or more processors to perform a process including:
sending a registration request message that includes an authentication certificate to a device registration service that operates in a service provider environment;
performing a device registration with the device registration service to register a device with the service provider environment, wherein the device registration associates the device with a user account and installs a dynamic device representation on the device, wherein the dynamic device representation includes a non-generic security certificate that allows the device to connect to a device configuration service located in the service provider environment;

connecting to the device configuration service using the non-generic security certificate to obtain a preconfigured device representation after the device is registered, the preconfigured device representation being associated with the user account; and receiving the preconfigured device representation from the device configuration service.

16. The non-transitory machine readable storage medium of claim 15, the process further including installing the preconfigured device representation on the device to enable the device to be paired with program codes that are executing in the service provider environment.

17. The non-transitory machine readable storage medium of claim 15, the process further including installing the preconfigured device representation on the device to enable the device to provide media content to be included in the preconfigured device representation.

18. The non-transitory machine readable storage medium of claim 15, the process further including connecting to the device registration service after being powered on using a device registration representation that is pre-installed on the device during a manufacturing process, the device registration representation including a uniform resource locator (URL) that enables the device to connect to the device registration service.

19. The non-transitory machine readable storage medium of claim 15, the process further including:

receiving supplemental representations associated with a type of the device; and installing the supplemental representations on the device to augment capabilities of the device associated with the type of the device.

20. The non-transitory machine readable storage medium of claim 15, the process further including sharing the preconfigured device representation with an additional device that has been registered with the device registration service, wherein the additional device is within a defined distance from the device.

* * * * *